United States Patent [19]

Kimura et al.

[11] 4,239,882

[45] Dec. 16, 1980

[54] PROCESS FOR PRODUCING POLYESTER

[75] Inventors: Tsuneo Kimura; Katsuhisa Kohyama; Takehiro Okada; Katsuyuki Sakata, all of Kita-Kyushu, Japan

[73] Assignee: Mitsubishi Chemical Industries Ltd., Tokyo, Japan

[21] Appl. No.: 609,964

[22] Filed: Sep. 3, 1975

[30] Foreign Application Priority Data

Sep. 3, 1974 [JP] Japan ............................ 49-10117

[51] Int. Cl.³ ........................................ C08G 17/013
[52] U.S. Cl. .................................. 528/209; 528/220; 528/295; 528/308
[58] Field of Search .................... 260/75 M, 75 R; 528/209, 220, 295, 308, 309

[56] References Cited

U.S. PATENT DOCUMENTS

| | | | |
|---|---|---|---|
| 3,644,294 | 2/1972 | Siclari et al. | 260/75 M |
| 3,940,367 | 2/1976 | Pelousek et al. | 260/75 M |

*Primary Examiner*—V. P. Hoke
*Attorney, Agent, or Firm*—Oblon, Fisher, Spivak, McClelland & Maier

[57] ABSTRACT

A polyester is produced in an improved process by esterification or interesterification of an aromatic dicarboxylic acid or an alkyl ester thereof with 1,4-butanediol followed by polycondensation of the resulting ester characterized in reusing the 1,4-dibutanediol mixture distilled in the polycondensation step without purification as a starting material for production of more polyester.

7 Claims, No Drawings

PROCESS FOR PRODUCING POLYESTER

BACKGROUND OF THE INVENTION

1. Field of the Invention

The present invention relates to a process for producing a polyester. More particularly, it relates to a process for economically producing a polyester using butanediol as a diol component in a simple step.

2. Description of the Prior Art

Heretofore, it has been known that 1,4-butanediol can be used as the diol component in a process for producing a polyester. The resulting product has been widely used because these polyesters have superior properties such as moldability, surface characteristics, size accuracy and the like. Among such polyesters, the most useful one is polybutyleneterephthalate which is effectively used as an engineering plastic for decorative components in electrical apparatus, machines, cars, sporting goods, interior decorative goods and the like.

In order to produce polyesters derived from 1,4-butanediol such as polybutyleneterephthalate, the reaction of one mole of terephthalic acid and/or a dialkyl ester with 1.1–2.2 moles of 1,4-butanediol is conducted at about 150°–230° C. for about 0.5–5 hours to produce bis(hydroxybutyl) terephthalate and oligomers thereof. Thereafter, the reaction is continued, heating at a temperature of about 230°–260° C. under a gradually reduced pressure of about 0.05–10 mmHg, until a polyester having a suitable degree of polymerization is produced. Depending upon the progress of the polycondensation, an excess of 1,4-butanediol is distilled out from the reaction system. It is quite important to recover and to reuse the distilled 1,4-butanediol mixture in the polycondensation system in order to lower the cost of the production of the polyester.

Customarily, the distilled 1,4-butanediol mixture is condensed, collected and purified by other refining processes such as distillation. However, 1,4-butanediol has low thermal stability, decomposing to tetrahydrofuran and water so that the refining step has low efficiency. Accordingly, it is necessary to conduct a pretreatment of the distilled 1,4-butanediol mixture such as by neutralization of the acidic impurities, with an alkali in order to prevent the decomposition of 1,4-butanediol to tetrahydrofuran. Consequently, there continues to exist a need for a more efficient, simple process for reusing the 1,4-butanediol in this reaction system.

SUMMARY OF THE INVENTION

Accordingly, it is an object of the present invention to provide a process for producing a polyester using 1,4-butanediol as the diol component in low cost and in an industrially advantageous manner.

Briefly, this and other objects of this invention as will hereinafter become clear from the ensuing discussion have been attained by providing a process for producing a polyester which comprises esterification or interesterification of an aromatic dicarboxylic acid or an alkyl ester thereof with 1,4-butanediol followed by polycondensation of the resulting ester, wherein the 1,4-butanediol which is distilled in the polycondensation is reused as a starting material for the polyester without purification.

DETAILED DESCRIPTION OF THE PREFERRED EMBODIMENTS

Heretofore, it was considered in the art that the polycondensation reaction would be greatly suppressed if a starting material having low purity were used. As a result, starting materials having high purity have been required for the production of polyesters. Furthermore, it has been universal practice to control even the water content of the starting material for the interesterification reaction for producing the alkyl ester of an aromatic dicarboxylic acid. In the 1,4-butanediol mixture which is distilled in the production of a polyester wherein 1,4-butanediol is utilized, more than several percent of water, produced along with the tetrahydrofuran by-product is included. Consequently, it has always been assumed that if the unpurified 1,4-butanediol mixture were used as a starting material for the polycondensation, hydrolysis of the dialkyl terephthalate would ensue, thereby suppressing the reaction of interest. Moreover, the 1,4-butanediol mixture distilled by the polycondensation also has a relatively high content of impurities, containing only 60–90% of the 1,4-butanediol component. This has fortified the belief, universally held in the art, that the polycondensation reaction would be significantly suppressed if the distilled 1,4-butanediol mixture were used without purification. However, contrary to these long-held common sense conclusions, the polyester is obtained in accordance with this invention, without adverse affects to either the polycondensation reaction or the physical properties of the product, by recycling the unpurified 1,4-butanediol as a starting material for the reaction. For example, colorless products can still be obtained. This is a totally unexpected discovery.

Components and conditions for the polycondensation reaction can be selected according to the very well-known conventional considerations. Suitable aromatic dicarboxylic acids for use in the polycondensation reaction include those selected from the compounds conventionally used for production of a polyester by polycondensation with 1,4-butanediol. These suitable aromatic dicarboxylic acids include phthalic acids such as terephthalic acid and isophthalic acid; naphthalene dicarboxylic acids such as 2,6-naphthalene dicarboxylic acid and 2,5-naphthalene dicarboxylic acid; and compounds having the formula

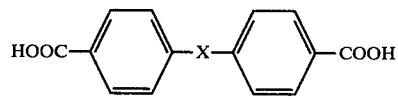

wherein X represents —O—, —CH$_2$—, —CH$_2$.CH$_2$—, —SO$_2$—, CO and the like, and mixtures thereof. In the reaction of the dicarboxylic acid and/or an alkyl ester thereof with 1,4-butanediol, it is customary to use a catalyst. Any conventional catalyst is sufficient. It is especially useful to use a titanium compound such as Ti(OR)$_4$ (R is a lower alkyl group having 1–10 carbon atoms), TiCl$_4$, Ti(SO$_4$)$_2$ or a hydrolyzed product thereof.

In the process of this invention, the 1,4-butanediol mixture distilled in the polycondensation can be condensed and collected by a heat-exchanger. The distilled 1,4-butanediol mixture contains vaporizable components such as tetrahydrofuran and water and, accordingly, the vaporizable components may be revaporized from the distilled liquid which has been condensed. Thus, the reduced pressure of the polycondensation system is difficult to maintain. Accordingly, it is preferred to cool the distilled liquid or to separate it from the reduced pressure system at a suitable time. In reusing the distilled 1,4-butanediol mixture without any purification, the distilled liquid itself can be used for the reaction. It is also possible to use the distilled liquid by mixing it with a suitable ratio of pure 1,4-butanediol, as determined by considerations such as cost-effectiveness. Most of the impurities, such as tetrahydrofuran and water, in the distilled 1,4-butanediol mixture are distilled out during the esterification or the interesterification. It is felt that the remaining portions of impurities are distilled out in the polycondensation, especially under reduced pressure. However, the reaction period is not affected by using the distilled 1,4-butanediol mixture. In the process of this invention, the conventional conditions for the production of the polyester can be employed, and the conventional technology can be applied directly.

In accordance with this invention, it is unnecessary to purify the distilled 1,4-butanediol mixture and it is possible to reuse all of it, whereby the cost for producing a polyester can be remarkably reduced and the apparatus normally required for distillation of 1,4-butanediol, the cost of heating and the labor involved can all be significantly reduced or eliminated. Accordingly, the process of this invention has a great industrial value.

A further understanding can be obtained by reference to certain specific examples which are provided herein for purposes of illustration only and are not intended to be limiting unless otherwise specified.

EXAMPLE 1

The purpose of this example is to illustrate the fact that no deterioration in the quality of the characteristics of the product or the operating procedure is caused by using the distilled 1,4-butanediol mixture as the diol component for producing polybutyleneterephthalate.

In a 30 liter reactor equipped with an anchor type stirrer, 8.0 kg of dimethyl terephthalate and 5.9 kg of 1,4-butanediol, i.e., a 1.6 molar ratio relative to dimethyl terephthalate, were charged and the mixture was heated to 150° C. 160 g of 7% solution of tetrabutoxytitanium in 1,4-butanediol was added to the mixture at a rate of 100 g/hour with stirring at 30 r.p.m. so as to initiate the interesterification. The mixture was gradually heated to reach a temperature of 200° C. after 1.5 hours, and the reaction was continued at 200° C. for 3.5 hours. The methanol component produced by the interesterification was distilled out through a distillating tower. The pressure of the system was reduced from 760 mm Hg to 1 mm Hg during 2.0 hours and the temperature of the system raised from 200° C. to 245° C. during 1 hour to effect reaction at 245° C. under a pressure of 1.0 mm Hg for 5 hours and 20 minutes after the initiation of reduced pressure. The intrinsic viscosity [$\eta$] of the resulting polymer was 1.240. The distilled material was directly condensed and collected after the initiation of the reduction of pressure using a heat exchanger without a fractionating column. The receiver for the distilled liquid was disconnected from the reduced pressure system after 3.0 hours from the initiation of the reduction of pressure. 2.3 kg of the distilled liquid which contained 90% of 1,4-butanediol was collected. The reaction was repeated under the same conditions twice to obtain about 7 kg of the distilled liquid. The reaction was repeated using 6.6 kg of the distilled 1,4-butanediol (5.9 kg as pure 1,4-butanediol) with 8.0 kg of dimethyl terephthalate. There was no difficulty in the reaction except for distillation of a large amount of the distilled liquid in the interesterification. The reaction was stopped after 5 hours and 20 minutes from the initiation of the reduction of pressure. The intrinsic viscosity [$\eta$] of the polymer was measured as 1.236. The intrinsic viscosity [$\eta$] was calculated by Huggin's constant K'=0.33 from [$\eta$rel] measured at 30.0° C. by a Ubbelohde's viscometer at a concentration of 1 g/dl of the polyester in a solvent mixture of phenol and tetrachloroethane (1:1 by weight).

EXAMPLE 2

The purpose of this example is to illustrate the fact that no deterioration in the quality of the characteristics of the product or the operating procedure is found by repeating the production of polybutylene terephthalate several times by using the distilled 1,4-butanediol mixture in conjunction with additional pure 1,4-butanediol. In a 30 liter reactor equipped with an anchor type stirrer, 9.0 kg of dimethyl terephthalate and 5.85 kg of 1,4-butanediol, i.e., a 1.4 molar ratio relative to dimethyl terephthalate, were charged. The reaction of Example 1 was repeated to obtain a polymer having an intrinsic viscosity [$\eta$] of 1.13 which had high whiteness, i.e., good hue. 1.3 kg of the distilled liquid having 66.8% of 1,4-butanediol was obtained in the polycondensation. Pure 1,4-butanediol was added to the distilled liquid to produce a 1.4 molar ratio of 1,4-butanediol relative to 9.0 kg of dimethyl terephthalate and the reaction was conducted. The reaction was repeated by reusing the distilled liquid as a part of the diol component. The results are shown in the following table.

Interesterification: 3 hours
Polycondensation: 5.5 hours

| Test No. | Amount charged (kg) | | | Distilled liquid for polycondensation (kg) | [$\eta$] | Hue value of polymer |
|---|---|---|---|---|---|---|
| | dimethyl terephthalate | pure 1,4-butanediol | distilled liquid (1,4-butanediol content) | | | |
| 1 | 9.0 | 5.85 | 0 | 1.3 | 1.13 | 4.7 |
| 2 | " | 5.03 | 1.3(66.8%) | 1.6 | 1.11 | 5.1 |
| 3 | " | 4.72 | 1.6(73.8%) | 1.6 | 1.14 | 4.7 |
| 4 | " | 4.75 | 1.6(71.6%) | 1.5 | 1.12 | 4.9 |
| 5 | " | 4.82 | 1.5(72.1%) | 1.5 | 1.12 | 5.0 |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. In a process for producing a polyester by esterification or interesterification of an aromatic dicarboxylic acid or an alkyl ester thereof with 1,4-butanediol followed by polycondensation of the resulting ester, an improvement comprising reusing the mixture of water, tetrahydrofuran and 1,4-butanediol distilled from the polycondensation step without purification as a starting material for production of more polyester.

2. The process of claim 1, wherein a mixture of the 1,4-butanediol mixture distilled in a polycondensation step and additional pure 1,4-butanediol is used as the starting material.

3. The process of claim 1, wherein a 1.1-2.2 molar ratio of 1,4-butanediol relative to the aromatic dicarboxylic acid or the alkyl ester thereof is used.

4. The process of claim 1, wherein the esterification or interesterification is conducted at about 150°-230° C. for about 0.5-5 hours and the polycondensation is conducted at about 230°-260° C. under a reduced pressure of about 0.05-10 mm Hg.

5. The process of claim 1, wherein the aromatic dicarboxylic acid is a phthalic acid, a naphthalene dicarboxylic acid or a compound having the formula

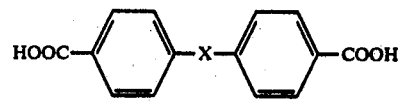

wherein X is —O—, —CH$_2$—, —CH$_2$CH$_2$—, —SO$_2$— or —CO—.

6. The process of claim 1, wherein 1,4-butanediol mixture distilled in the polycondensation step is cooled, condensed and collected by a heat exchanger.

7. The process of claim 1, wherein the unpurified excess 1,4-butanediol remaining after the polycondensation step is cyclically reused as at least a portion of the starting material for further production of polyester.

* * * * *